(12) United States Patent  
Mosko

(10) Patent No.: US 8,130,795 B2
(45) Date of Patent: Mar. 6, 2012

(54) IN-BAND TIME SYNCHRONIZATION TECHNIQUE

(75) Inventor: Marc Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 685 days.

(21) Appl. No.: 12/258,012

(22) Filed: Oct. 24, 2008

(65) Prior Publication Data

US 2010/0103922 A1 Apr. 29, 2010

(51) Int. Cl.
*H04J 3/06* (2006.01)
*H04B 7/212* (2006.01)
(52) U.S. Cl. .......................... 370/507; 370/442
(58) Field of Classification Search .......... 370/328, 370/329, 321, 347, 337, 445, 443, 447, 461, 370/462, 338, 330, 350, 442, 503, 507, 508, 370/509, 510, 518
See application file for complete search history.

(56) References Cited

U.S. PATENT DOCUMENTS

| 7,957,356 B2 * | 6/2011 | Wang et al. ............. 370/338 |
| 2006/0215583 A1 * | 9/2006 | Castagnoli ............. 370/254 |

* cited by examiner

*Primary Examiner* — Hanh Nguyen
(74) *Attorney, Agent, or Firm* — Shun Yao; Park, Vaughan, Fleming & Dowler LLP

(57) ABSTRACT

A communication system includes devices configured to communicate with each other via wireless communication by exchanging information in a sequence of time slots in frames. These time slots may be synchronized across the devices using distributed mutual synchronization in which each device exchanges time stamps in the frames with other devices to stabilize clock signals in the devices about a common frequency. Moreover, a time stamp in a given time slot may be generated by a transmitting device, which is transmitting in the given time slot, based on a clock signal in the transmitting device.

20 Claims, 2 Drawing Sheets

IN-BAND TIME SYNCHRONIZATION TECHNIQUE

BACKGROUND

1. Field of the Invention

The present invention relates to techniques for synchronizing devices in a network. More specifically, the present invention relates to an in-band synchronization technique for devices.

2. Related Art

It is often necessary to synchronize devices in a communication system that utilizes a time-domain multiple-access (TDMA) communication protocol. This synchronization ensures that all of the devices start their time slots at approximately the same time so that all of the time-slot boundaries are aligned. For example, in a communication system that has 1-ms time slots, the synchronization may be accurate to within 10-20 µs.

In some communication systems, this synchronization is achieved using devices that have highly stable and accurate clock circuits, which are synchronized once (for example, when they are manufactured). However, providing these clock circuits increases the cost of the devices, and thus, the overall cost of the communication system.

Alternatively, in many distributed communication systems, less-expensive clock circuits are synchronized using an external reference signal, such as the signals provided by the global positioning system (GPS). While this synchronization technique is often suitable in outdoor communication systems, it may not work in indoor communication systems or in vehicle applications where a vehicle may go in and out of GPS reception.

Moreover, in these communication systems the external reference signal is typically provided by a central authority (such as the GPS) that organizes or manages the synchronization of the devices. Unfortunately, in many communication systems, such as ad hoc networks, this type of central authority is not available. This makes the use of less-expensive clock circuits more difficult, and may also result in less efficient use of the available communication bandwidth (e.g., larger guard bands may be needed between adjacent time slots).

Hence, what is needed is a method and an apparatus that facilitates synchronization in communication systems without the problems listed above.

SUMMARY

One embodiment of the present invention provides a communication system, which includes devices in a network (such as an ad hoc network) that are configured to communicate with each other via wireless communication through a sequence of time slots in frames. These time slots are synchronized across the devices using distributed mutual synchronization in which each device exchanges time stamps in the frames with other devices to stabilize clock signals in the devices about a common frequency. Moreover, a time stamp in a given time slot is generated by a transmitting device, which is transmitting in the given time slot, based on a clock signal in the transmitting device.

These clock signals may be synchronized without an external synchronization signal from another device external to the devices.

Communication through the sequence of time slots in the frames may include time-domain multiple access (TDMA). Moreover, the devices may communicate using multi-hop communication. Additionally, the transmitting device may reserve one or more time slots using a contention-free scheduling protocol.

In some embodiments, for the given time slot, the time stamp is included in a fixed-length timing packet, and data is included in a variable-length data packet.

In some embodiments, the clock signals are synchronized using a clock-sampling mutual-network-synchronization protocol. Moreover, the clock signals may be synchronized using proportional control. For example, the time stamp may be proportional to the product of a synchronization factor and a drift time determined from the clock signal in the transmitting device. This synchronization factor may be updated based on a product of a proportionality factor (such as a factor between approximately 0 and 1) and a relative error, where the relative error corresponds to the difference of the product of a received time stamp from another one of the devices and the product of the synchronization factor and the drift time. For relative errors greater than a threshold, the proportionality factor may be greater than a pre-determined value, thereby accelerating synchronization to the common frequency, and for relative errors less than the threshold, the proportionality factor may be less than the pre-determined value, thereby improving stability of the common frequency. Furthermore, the time stamp may include timing offsets associated with queuing latency and transmission latency.

Another embodiment provides one of the devices for use in the communication system. This device includes a transceiver configured to communicate with the other devices in the network via wireless communication through the sequence of time slots in the frames. A clock circuit in the device is configured to provide the clock signal that determines timing of the time slots. Moreover, control logic in the device is configured to synchronize the clock signal with clock signals in the other devices in the network about the common frequency using distributed mutual synchronization in which the device exchanges time stamps in the frames with the other devices. Additionally, the device includes the time stamp which is generated based on the clock signal while transmitting in the given time slot.

Another embodiment provides a method for synchronizing devices in a network, which may be performed by the devices in the communication system. During operation, the devices transmit and receive, via wireless communication between the devices, the sequence of time slots in the frames, where the time stamp, which is generated based on the clock signal in the transmitting device, is included in the given time slot. Next, the devices synchronize the time slots across the devices using distributed mutual synchronization in which differences between the exchanged time stamps and time values corresponding to clock signals in the devices are used to stabilize the clock signals about the common frequency.

Figure 1:
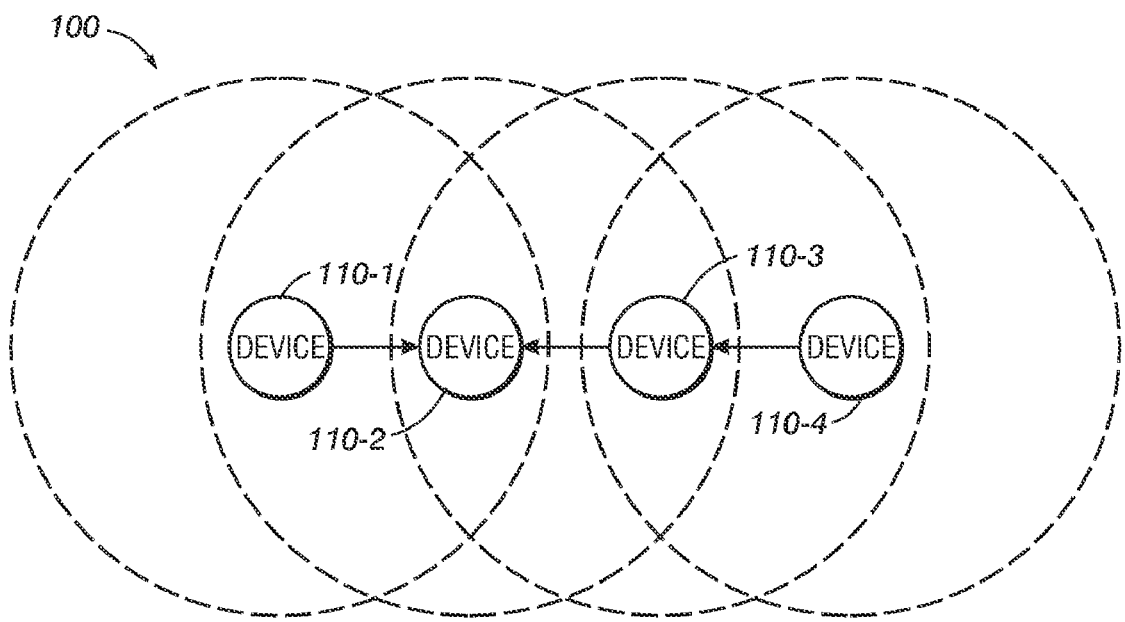
FIG. 1 is a block diagram illustrating a communication system in accordance with an embodiment of the present invention.

Table 1 provides communication-system parameters in accordance with an embodiment of the present invention.

Table 2 provides simulated relative synchronization performance in accordance with an embodiment of the present invention.

Table 3 provides simulated absolute mean synchronization error in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a communication system, a method, and a device for use with the communication system are described. Communication between the devices in the communication system may be enabled by the method. In particular, nodes or devices (henceforth referred to as devices) in a network (such as an ad hoc network) in the communication system may communicate with each other via wireless communication by exchanging information in a sequence of time slots in frames. These time slots (and, in particular, the time-slot boundaries) may be synchronized across the devices using distributed mutual synchronization in which each device exchanges time stamps in the frames with other devices to stabilize clock signals in the devices about a common frequency. Moreover, a time stamp in a given time slot may be generated by a transmitting device, which is transmitting in the given time slot, based on a clock signal in the transmitting device.

This synchronization technique may allow less-expensive clock circuits to be used in the devices. Moreover, these devices may be synchronized with each other without the use of an external reference signal, which is provided by another device that is external to the devices. Consequently, this synchronization technique may be used in indoor communication systems and/or vehicle applications where a central authority to provide the external reference signal is unavailable, or where reception of the external reference signal is unreliable. By synchronizing the devices in these communication systems and applications, this synchronization technique may reduce the overall cost and may improve the communication efficiency (e.g., smaller guard bands may be used between adjacent time slots).

We now discuss embodiments of a communication system. FIG. 1 presents a block diagram illustrating a communication system 100. In this communication system, devices 110 in a network communicate with each other via wireless communication through a sequence of time slots (such as time slots 200 in FIG. 2) in frames (such as frames 210 in FIG. 2). Each of devices 110 may communicate with a subset of communication system 100. For example, a given device, such as device 110-2, may communicate with neighboring devices in a one-hop, two-hop, or three-hop neighborhood (i.e., these devices may communicate via 0, 1, or 2 intermediary devices).

Time slots are synchronized across the devices 110 using distributed mutual synchronization in which each device (such as device 110-2) exchanges time stamps in the frames with other devices (such as devices 110-1, 110-3 and 110-4) to stabilize clock signals in the devices 110 about a common frequency. Moreover, a time stamp in a given time slot is generated by a transmitting device, which is transmitting in the given time slot, based on a clock signal in the transmitting device.

In an exemplary embodiment, the in-band signaling of time stamps is used to synchronize devices in a network that uses a TDMA communication protocol without reliance on an external reference signal, such as that provided by GPS. This synchronization technique may be used in distributed communication systems in which there is no central authority for organization or management (e.g., in which there is no central authority to provide a single authoritative reference or timing signal), such as the multi-hop ad hoc network illustrated in FIG. 1.

Note that the given device may interfere with another device, such as device 110-3, if this other device is within transmission range. Furthermore, devices 110 may compete with one another for access to a shared communication channel. Therefore, devices 110 may reserve time slots (such as one or more time slots 200 in FIG. 2) using a channel-access protocol, which determines a transmission schedule for the shared communication channel. This transmission schedule may be calculated in a distributed manner (i.e., a decentralized manner) to eliminate contention between devices 110, and to allow reservations.

In an exemplary embodiment, the channel-access protocol includes a contention-free scheduling protocol. For example, the channel-access protocol may be a context-aware signaling and access (CASA) protocol. In the CASA protocol, the given device determines which, if any, of the available time slots to reserve or to release based on a dynamic scheduling technique. Based on the reservations, only one device will transmit per time slot in a contending neighborhood. This will ensure that neighbors of the given device, i.e., the possible recipients, will not get interference from their neighbors. To achieve this, devices 110 may maintain current context information about their neighborhood, i.e., the devices benefit from knowledge about the local environment in which they operate. Note that the CASA protocol allows time slots (and, more generally, sub-channels) to be reserved without collapsing under load, and also utilizes the channel fully. Furthermore, if the given device has no information to send, it may choose not to participate in the election process. However, if the given device has specific traffic demand, it can choose to reserve certain time slots in future frames. This drastically reduces the uncertainty in the transmission schedule for the given device and, thus, reduces jitter.

Figure 2:
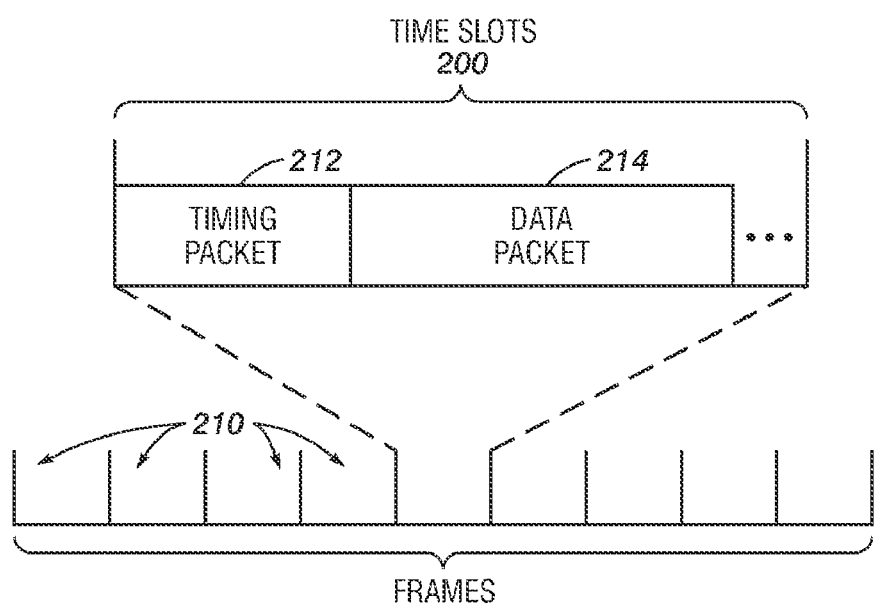
FIG. 2 is a block diagram illustrating frames for use in the communication system of FIG. 1 in accordance with an embodiment of the present invention.

FIG. 2 presents a block diagram illustrating frames 210 for use in communication system 100 (FIG. 1). A communication channel in communication system 100 is divided into multiple sub-channels in the form of frames 210. Each frame may include multiple time slots 200 (which are used as an illustrative example of a type of sub-channel). These time slots may include a fixed-length timing packet 212 that includes the time stamp of the transmitting device and one or more variable-length data packets, such as data packet 214. Note that in embodiments where the CASA protocol is used, each time slot includes context information about the internal state of devices 110 (FIG. 1), the state of the network (the number of devices, data traffic flows, etc.), and the state of the environment around devices 110 (FIG. 1) in a neighborhood in the network. This context information may be used by devices 110 (FIG. 1) to dynamically determine the transmission schedule.

In some embodiments, communication system 100 (FIG. 1) and/or frames 210 (FIG. 2) include fewer or additional components. Moreover, two or more components may be combined into a single component, and/or a position of one or more components may be changed. For example, the number of time slots per second that are communicated depends on timing and hardware. A time slot could be anywhere from 0.5 to 500 ms depending on how well the hardware keeps clocks synchronized between devices 110 (FIG. 1). Thus, the number of data packets 214 (FIG. 2) in frames 210 (FIG. 2) may vary in different embodiments.

This synchronization technique may be utilized in a wide variety of communication systems and applications, including: local-area networks or LANs (such as WiFi, WiMax, and/or a LAN that utilizes a communication protocol that is compatible with an IEEE 802 standard), wide-area networks or WANs, metropolitan-area networks or MANs, and/or cellular telephone networks (such as the Global System for Mobile communication or GSM). In addition, communication system 100 (FIG. 1) may include fixed and/or mobile devices. Thus, the communication protocol and channel-access protocol may need to adapt as the network topology changes, i.e., communication system 100 (FIG. 1) may be dynamic. Moreover, this network topology may be regular (such as one with fixed cells) or random (such as an ad hoc network).

Figure 3:
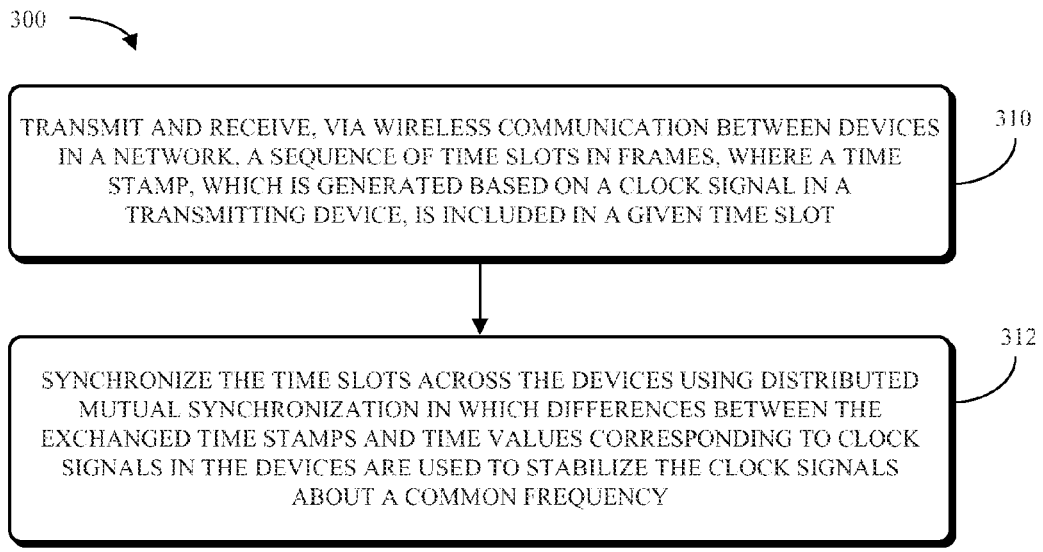
FIG. 3 is a flow chart illustrating a process for synchronizing devices in a communication system in accordance with an embodiment of the present invention.

We now describe embodiments of a process for synchronizing devices in communication system 100 (FIG. 1). FIG. 3 presents a flow chart illustrating a process 300 for synchronizing devices in a communication system, which may be performed by the devices in the communication system (such as devices 110 in FIG. 1). During operation, the devices transmit and receive, via wireless communication between the devices, the sequence of time slots in the frames (310), where the time stamp, which is generated based on the clock signal in the transmitting device, is included in the given time slot. Next, the devices synchronize the time slots across the devices using distributed mutual synchronization in which differences between the exchanged time stamps and time values corresponding to clock signals in the devices are used to stabilize the clock signals about the common frequency (312).

In some embodiments of process 300, there may be additional or fewer operations. Moreover, the order of the operations may be changed, and/or two or more operations may be combined into a single operation. For example, time stamps may be included in each time slot or, for a given transmitting device, may be included in one of a series of consecutive time slots but not in each reserved time slot.

Figure 4:
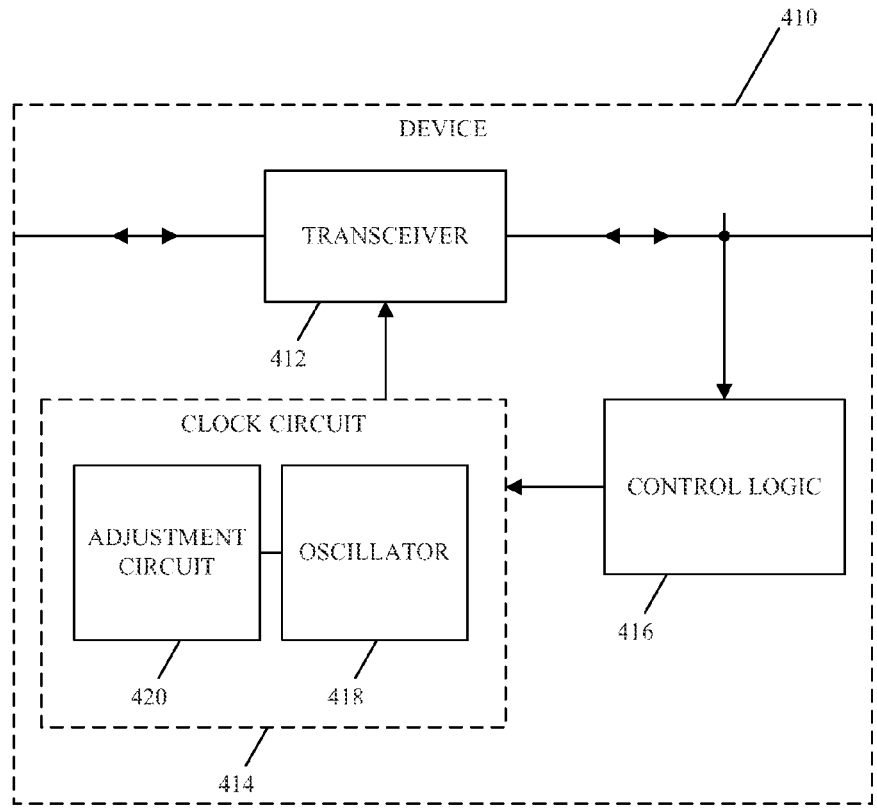
FIG. 4 is a block diagram illustrating a device in accordance with an embodiment of the present invention.

We now describe embodiments of a device for use in communication system 100 (FIG. 1). FIG. 4 presents a block diagram illustrating a device 410. This device includes a transceiver 412 configured to communicate with the other devices in the network via wireless communication through the sequence of time slots in frames. A clock circuit 414 in device 410 is configured to provide the clock signal that determines timing of the time slots. For example, adjustment circuit 420 may adjust a free-running clock signal output by oscillator 418 to provide the clock signal. Moreover, control logic 416 in device 410 is configured to synchronize the clock signal with clock signals in the other devices in the network about the common frequency using distributed mutual synchronization in which device 410 exchanges time stamps in the frames with the other devices. Additionally, device 410 includes the time stamp which is generated based on the clock signal while transmitting in the given time slot.

In some embodiments, device 410 includes fewer or additional components. Moreover, two or more components may be combined into a single component, and/or a position of one or more components may be changed.

In an exemplary embodiment, the clock signals are synchronized using a clock-sampling mutual-network-synchronization protocol (CSMNS) (see, for example, C. H. Rentel, "Network time synchronization and code-based scheduling for wireless ad hoc networks," Ph.D. thesis, Carleton University, 2006). In CSMNS, a proportional controller is used to drive the clock in each device to the common frequency and, thus, a common time. Let device i have a real-time clock with drift $\beta_i$ and initial phase offset $\alpha_i$, then the drift time ($t_i^d$) at device i is $$t_i^d(t) = \beta_i \cdot t + \alpha_i \quad (1)$$

Each device has a synchronization factor $s_i$ such that the synchronized time ($t_i^s$) at device i is $$t_i^s = s_i \cdot t_i^d.$$

The synchronization factor $s_i$ is maintained by a synchronization protocol via a proportional control equation. Initially, the synchronization factor $s_i$ equals one. Each time device i receives a timing packet (such as timing packet 212 in FIG. 2) from a neighboring device, it updates $s_i$. Let device i receive such a timing packet with a timestamp $t_j^{rx}$ from device j. Device i updates $s_i$ using $$s_i = s_i + K \cdot \frac{t_j^{rx} - t_i^s}{t_i^s} \quad (2)$$

In this equation, K is a proportionality factor, which typically takes a value in the range 0.3 to 0.8. Note that the ratio in Eqn. 2 is referred to as the relative error.

Integration of a TDMA medium-access-control layer with in-band time synchronization is illustrated using the CASA protocol. Note that other protocols could be used, including a non-TDMA protocol, such as IEEE 802.11. In the following example, the real-time drift clock $t^d$ is measured in microseconds.

When a device i first initializes, it sets $s_i$ equal to one and listens to the network for a period $T_{init}$ (such as 1 s) to acquire timing information. If device i receives a first timing packet with time stamp $t_0$, it sets its real-time clock $t_i^d$ to $t_0$. After receiving the first timing packet during $T_{init}$, device i changes to a fast-lock operation mode. However, if no timing packet is received, device i switches to a slow-lock operation mode.

During the fast-lock operation mode, device i adjusts its time per Eqn. 2 with the proportionality factor K equal to 0.8. Once the relative error is less than 10%, device i switches to the slow-lock operation mode. During this operation mode, device i beacons (or transmits) a time stamp in each available time slot with a probability $p_{fast}$ and at least every $t_{fast}$ seconds.

Upon entering the slow-lock operation mode, device i sets $t_i^s$ to $s_i \cdot t_i^d$, and then sets $s_i$ equal to one. In this operation mode, device i adjusts its time per Eqn. 2 with the proportionality factor K equal to 0.3. Moreover, device i beacons a time stamp in each available time slot with probability $p_{slow}$ and at least every $t_{slow}$ seconds. If the relative error is greater than a maximum relative error of 15% for more than five timing packets from neighboring devices (the maximum-slow-errors value), device i switches to the fast-lock operation mode.

In all of the transmitted beacons (or time stamps), device i adds in predictable timing offsets, such as the estimated queuing latency and the transmission latency (based on the data rate and the number of bytes in the data packet). Thus, the transmitted beacon or time stamp for device i contains the time $$t_i^{tx} = s_i \cdot (t_i^d + T_{queue} + T_{transmission}).$$

In an actual communication system, protocol timers (or clock circuits) may be set to a synchronized time. However, because the synchronized time is being adjusted continuously via Eq. 2, this may pose a problem. One solution is to use a timer min heap, such that the root node is the minimum synchronized time of any outstanding timer. Then, the timer system (such as clock circuit 414 and control logic 416 in FIG. 4) will set a system timer to the predicted drift time of the minimum heap time $$t_{alarm} = \frac{t_{min}}{s_i} \quad (3)$$

When the system timer expires or the synchronization system adjusts $s_i$ via Eqn. 2, the timer system will determine if $t_{min} - t_i^s$ is less than or equal to the timer slack (20 μs) using signed numbers. If yes, the timer system will fire the corresponding protocol timer. This check is made repeatedly for the min heap root until the tree is empty or the check fails. If the check fails, the timer system will set a new system timer for the difference.

For performance reasons, $s_i$ may be represented using a 96-bit fixed point notation while $t_i^d$ and $t_i^s$ may be 64-bit integers. This allows efficient fixed-point integer math to be used when performing the calculation of Eqn. 3 rather than floating-point math.

Depending on how packets are transmitted and received in the time slots, the timer system may need to take special actions for the timing packets. In one embodiment using IEEE 802.11 hardware in TDMA mode, in which it may not be possible to make hardware changes, the timer system may use two physical-layer convergence-procedure (PLCP) packets. A first PLCP packet in a time slot may be a short, fixed-length timing packet (such as less than a few bytes). Moreover, a second PLCP packet may be a variable-length data packet. This configuration allows the hardware to process the timing-packet cyclic redundancy check, and to pass it to the device driver with minimum latency. In the device driver, the timer system can read $t^{tx}$ and $t^s$ for use in Eqn. 2.

Note that if it is possible to access the hardware, or if there is a way to reliably know the first-bit time of a received time slot, then the two-packet technique may not be needed. However, it may still be desirable, for example, when using a common modulation technique or different transmission power than in the data packet.

Simulations of this synchronization technique were performed using a QualNet simulator (from Scalable Network Technologies, Inc., of Los Angeles, Calif.). In these simulations, the CASA protocol was compared to IEEE 802.11e. Note that both the CASA protocol and IEEE 802.11e utilize the IEEE 802.11a physical layer at 12 Mbps.

Averages over five simulation runs with independent random number seeds are presented. Moreover, assuming normal distributions, the results reflect the 95% confidence interval. As described below, despite the extra overhead transmitted to coordinate CASA devices, the CASA protocol outperforms IEEE 802.11e in a variety of network topologies and workloads. All of the CASA experiments were performed using the in-band synchronization technique, as well as with perfectly synchronized devices.

In these simulations, static routing files for determining packet paths were used because the medium-access-layer performance is being evaluated. For random-topology simulations, these static files were generated by taking a snapshot of an IEEE 802.11e simulation with an optimized-link-state-routing protocol as the routing protocol. This ensures repeatability between simulations and a more direct comparison to IEEE 802.11e.

The initial simulations used a 9-device cross topology. In this topology, the edge devices cannot directly communicate with each another and serve as end points for the workload applications. This topology presents interesting challenges, including the hidden terminal problem and critical devices. Note that the center device in the cross topology creates a bottleneck because it must forward all data traffic in the network. This small and simple-looking topology will be used to build intuition about how the CASA protocol performs when compared with a contention-based protocol.

In the cross-topology simulations, a constant-bit-rate (CBR) workload application sent over Internet protocol/user datagram protocol (IP/UDP) was used, and the number of flows was varied from 1 to 64. Each flow started at an edge device and ended at the opposite edge device. The flows were applied in a clock-wise manner as the number of flows increases. Moreover, each CBR packet was 50-bytes long and the packets were generated every 20 ms. Although CBR applications are not realistic, they can be compared to voice-over-Internet-protocol (VoIP) traffic. If the 50 bytes are divided into 16 bytes for the real-time transport protocol (RTP) and 34 bytes for audio samples, the RTP rate is 13.6 kbps in comparison to a 9-kbps VoIP codec, such as G.729a.

A second set of simulations used a 50-device random topology. In this random topology, a device was placed in the center of the topology area and acted as a gateway for the wireless network. All traffic was designed to pass through the gateway to a set of devices coupled by a 1 Gbps Ethernet. These devices acted as hypertext transfer protocol (HTTP) servers and end points for simulated voice calls. Moreover, each 50-device topology was generated in a 2500 m×1000 m area and checked for inter-connectivity. Results over five random seeds were averaged for both the CASA protocol and IEEE 802.11e.

In these simulations, the workload was a mixture of Web and Voice. A web-browsing load was generated by the QualNet HTTP module, which models browsing patterns. Moreover, a browsing session to external HTTP servers was executed on every device inside the wireless network. Voice was modeled by a series of alternating CBR flows between two devices, thereby simulating a conversation. Each of these flows had an exponentially distributed random duration with a mean of 30 s. Note that the same data rate as the cross-topology simulations was used, with 50-byte packets every 20 ms. Additionally, each voice session was between a random wireless device and an external device, and call initiators were randomly chosen between the device pairs. Furthermore, all traffic started within the first 2-6 s of the simulation and ended at 290 s, with all simulations running for a total of 300 s.

Parameter settings for the CASA simulations are shown in Table 1. While these are parameters are static values, in other embodiments distributed techniques are used to adjust these parameters based on network conditions and traffic. Note that for IEEE 802.11e, Access Category 3 was used for voice traffic and Access Category 0 was used for data traffic.

TABLE 1

| Parameter | Value |
|---|---|
| Time-Slot Size | 0.5 ms |
| Time Slots Per Frame | 400 |
| Time-Slot MTU | 650 bytes |
| Maximum Number of Reservable Time Slots Per Device | 300 |
| Maximum New Local Reservations Per Frame | 4 |
| Interference Neighborhood | 4 hops |
| Neighborhood Expiration | 2 s |
| Neighborhood Reservation Expiration | 2001 ms |
| Local Reservation Expiration | 1601 ms |
| CASA Guard Intervals | 10 μs |

Because it is a contention-free medium-access-control protocol, the CASA protocol has few collisions. However, packets can still be dropped because of: fading channels, errors due to additive noise, or collisions in the infrequent case of stale context. All of the CASA simulations were performed with three acknowledgement modes. CASA-TcpAck utilizes a very basic acknowledgement technique that transmits an acknowledge (ACK) for each transmission control protocol (TCP) packet. Packets are retransmitted after 50 ms of not receiving an ACK. In addition, an optimal acknowledgement technique called Magical Acks (CASA-MajAck) was simulated, in which all packets (UDP and TCP) are instantly acknowledged without any overhead. Note that the retransmission timeout for CASA-MajAck is 2 ms. In both of these acknowledgement techniques, packets are retransmitted a maximum of three times. Finally, a base technique without any acknowledgements (CASA-NoAcks) is presented. Both CASA-TcpAcks and CASA-MajAcks are presented because a practical, well-engineered ACK technique may perform between these two bounds. Furthermore, note that CASA-TcpAcks, which sends one ACK packet per data packet is naïve and can be improved, while CASA-MajAcks has zero overhead, but is clearly impractical.

The 50-device random topology simulations were based on the gateway topology. In particular, the gateway device in these simulations was device 1, which was located in the center of the topology. All workload traffic must travel through the gateway, and in most cases, the devices were multiple hops away. For the HTTP traffic, all of the servers were past the gateway. Moreover, the voice flows had one end point in the random topology and the other past the gateway. The number of voice sessions (CBR flows) varied from 0 to 50 in the simulations with a background load of 50 HTTP flows, i.e., one HTTP connection per randomly placed wireless device.

In the QualNet simulator, independent drift clocks were created for each device's medium-access-control layer. As described previously, a drift clock has an offset and a drift, which was chosen uniformly over a range of 0-100 μs. In the simulations, the drift was chosen uniformly between −25 ppm and +25 ppm, which is similar to the IEEE 802.11 requirements for clocks. Therefore, in Eqn. 1 $\beta_i$ was set to 1+ppm 10-6. Moreover, the proportionality factor K in Eqn. 3 was 0.5. In general, the communication system self-synchronized accurately enough for a TDMA communication protocol within the first several frames (about 1 s).

Table 2 presents the relative difference of the in-band time synchronization to perfect timing, in terms of a voice CBR delivery ratio, which is less than 1%. These simulations were for 50 devices with 50-HTTP flows. Note that the "voice" column is the number of CBR voice flows. Moreover, the "relative difference" column is the CBR delivery ratio for the synchronized simulations relative to the perfect-timing simulations. If X is the CBR delivery ratio, then this column is $$\frac{X_{sychronized} - X_{perfect}}{X_{perfect}}.$$

TABLE 2

| Scenario | Voice | Relative Difference |
|---|---|---|
| TcpAcks | 5 | 0.002 |
| MajAcks | 5 | 0.005 |
| NoAcks | 5 | 0.004 |
| TcpAcks | 10 | 0.001 |
| MajAcks | 10 | 0.001 |
| NoAcks | 10 | 0.003 |
| TcpAcks | 25 | 0.002 |
| MajAcks | 25 | 0.002 |
| NoAcks | 25 | 0.009 |
| TcpAcks | 50 | 0.000 |
| MajAcks | 50 | 0.005 |
| NoAcks | 50 | −0.003 |

Table 3 presents the time synchronization accuracy for the 50-device gateway simulations. Note that the scenario "drift" is for an uncorrected drift clock. Moreover, the column "mean absolute error" is the mean absolute error of the synchronized time as seen at the end of the 300-s simulation over all five random-number seed trials.

TABLE 3

| Scenario | Voice | Mean Absolute Error (μs) |
|---|---|---|
| Drift | All | 3655.854 ± 2147.581 |
| TcpAcks | 0 | 1.205 ± 0.825 |
| MajAcks | 0 | 1.701 ± 1.589 |
| NoAcks | 0 | 3.062 ± 4.177 |
| TcpAcks | 5 | 1.654 ± 1.621 |
| MajAcks | 5 | 1.296 ± 1.078 |
| NoAcks | 5 | 1.194 ± 0.895 |
| TcpAcks | 10 | 1.925 ± 1.250 |
| MajAcks | 10 | 2.091 ± 2.068 |
| NoAcks | 10 | 1.698 ± 1.455 |
| TcpAcks | 25 | 1.981 ± 1.678 |
| MajAcks | 25 | 1.773 ± 1.428 |
| NoAcks | 25 | 1.956 ± 1.463 |
| TcpAcks | 50 | 5.669 ± 9.431 |
| MajAcks | 50 | 3.592 ± 3.361 |
| NoAcks | 50 | 1.525 ± 1.180 |

These results indicate that the uncontrolled drift clock has a mean absolute error of 3656 μs with a standard deviation of 2148 μs. Assuming a normal distribution, the 99% confidence interval (±2.576σ) spread of the clocks is larger than 11 ms. For the controlled clocks, the mean absolute error is between 1.205 to 5.669 μs. Moreover, the standard deviation of the error is well controlled between 0.825 and 9.431 μs. This gives a worst-case spread over a 48-μs interval for the 9.431 μs case. Note that the majority of the deviations are close to 2 μs, which has a 99% confidence interval spread of 10.3 μs. Given the very close simulated performance of the in-band time synchronization with perfect timing, based on these simulations it appears that a 10-μs guard interval between time slots (as shown in Table 1) may be used with a TDMA communication protocol and the time synchronization technique.

In these simulations, the in-band time synchronization technique maintains clock synchronization accurately enough that a dynamic TDMA communication protocol can be used. By including timing information in every time slot, the time synchronization is able to keep clock drift under control.

While the preceding embodiments have used TDMA as an illustrative example, in other embodiments the time synchronization technique can be extended to frequency division multiple access (FDMA), code division multiple access (CDMA), and/or spatial diversity communication protocols. Moreover, while a fast-lock operation mode and a slow-lock operation mode were used as illustrative examples, in other embodiments if the relative error is large, the lagging clock may take a large phase step forward (i.e., $s_i$ equals one), and when the relative error is small, the slow-lock operation mode may be used.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A communication system, comprising:
   a first device and a second device in a network that are configured to communicate with each other via wireless communication through a sequence of time slots in frames;
   wherein the first device transmits, via the wireless communication, a first sequence of time slots in frames to the second device, wherein a first time slot of the first sequence includes a time stain that the first device generates while transmitting in the first time slot based on a clock signal in the first device;
   wherein the first device receives, via the wireless communication, a second sequence of time slots in frames from the second device, wherein a second time slot of the second sequence includes a time stamp that the second device generates while transmitting in the second time slot based on a clock signal in the second device; and
   wherein the time slots are synchronized across the first and second devices using distributed mutual synchronization, in which the first device determines a stable clock signal about a common frequency for the first and second devices based on a difference between the second time stamp and a time value corresponding to a clock signal in the first device from the time the second time slot is received.

2. The communication system of claim 1, wherein the network includes an ad hoc network.

3. The communication system of claim 1, wherein the communication through the sequence of time slots in the frames includes time-domain multiple access (TDMA).

4. The communication system of claim 1, wherein the first and second devices communicate using multi-hop communication.

5. The communication system of claim 1, wherein the first device reserves one or more time slots using a contention-free scheduling protocol.

6. The communication system of claim 1, wherein, for a given time slot, the time stamp is included in a fixed-length timing packet and data is included in a variable-length data packet.

7. The communication system of claim 1, wherein the clock signals in the first and second devices are synchronized without an external synchronization signal from another device external to the first and second devices.

8. The communication system of claim 1, wherein the clock signals in the first and second devices are synchronized using a clock-sampling mutual-network-synchronization protocol.

9. The communication system of claim 1, wherein the clock signals in the first and second devices are synchronized using proportional control.

10. The communication system of claim 9, wherein a time stamp is proportional to the product of a synchronization factor and a drift time determined from the clock signal in the first device;
    wherein the synchronization factor is updated based on a product of a proportionality factor and a relative error; and
    wherein the relative error corresponds to the difference of the product of a received time stamp from the second device and the product of the synchronization factor and the drift time.

11. The communication system of claim 10, wherein the time stamp includes timing offsets associated with queuing latency and transmission latency.

12. The communication system of claim 10, wherein, for relative errors greater than a threshold, the proportionality factor is greater than a pre-determined value, thereby accelerating synchronization to the common frequency; and
    wherein, for relative errors less than the threshold, the proportionality factor is less than the pre-determined value, thereby improving stability of the common frequency.

13. The communication system of claim 10, wherein the proportionality factor is approximately between 0 and 1.

14. A device, comprising:
    a transceiver configured to communicate with a remote device in a network via wireless communication through a sequence of time slots in frames;
    a clock circuit configured to provide a clock signal that determines timing of the time slots;
    wherein the transceiver transmits a first sequence of time slots in frames to the remote device, wherein a first time slot of the first sequence includes a first time stamp that the transceiver generates while transmitting in the first time slot based on a clock signal in the clock circuit;
    wherein the transceiver receives a second sequence of time slots in frames from the remote device, wherein a second time slot of the second sequence includes a second time stamp that the remote device generates while transmitting in the second time slot based on a clock signal in the remote device; and
    control logic configured to synchronize the clock signal with clock signals in the remote device using distributed mutual synchronization, which comprises determining a stable clock signal about a common frequency with the remote device based on a difference between the second time stamp and a time value corresponding to a clock signal from the time the second time slot is received.

15. The device of claim 14, wherein the clock signal is synchronized with the clock signals without an external synchronization signal from an external device which is external to the device and the remote device.

16. The device of claim 14, wherein the clock signal is synchronized using proportional control.

17. The device of claim 16, wherein a time stamp is proportional to the product of a synchronization factor and a drift time determined from the clock signal in the device;
    wherein the synchronization factor is updated based on a product of a proportionality factor and a relative error; and wherein the relative error is the difference of the product of a received time stamp from the second device and the product of the synchronization factor and the drift time.

18. The device of claim 17, wherein the time stamp includes timing offsets associated with queuing latency and transmission latency.

19. The device of claim 14, wherein, for relative errors greater than a threshold, the proportionality factor is greater than a pre-determined value, thereby accelerating synchronization to the common frequency; and wherein, for relative errors less than the threshold, the proportionality factor is less than the pre-determined value, thereby improving stability of the common frequency.

20. A method for synchronizing devices in a network, comprising:

transmitting, by a first device via wireless communication between the first device and a second device, a first sequence of time slots in frames to the second device, wherein a first time slot of the first sequence includes a first time stamp that the first device generates while transmitting in the first time slot based on a clock signal in the first device;

receiving, at the first device via the wireless communication, a second sequence of time slots in frames from the second device, wherein a second time slot of the second sequence includes a time stamp that the second device generates while transmitting in the second time slot based on a clock signal in the second device; and synchronizing the time slots across the first and second devices using distributed mutual synchronization, which comprises determining a stable clock signal about a common frequency for the first and second devices based on a difference between the second time stamp and a time value corresponding to a clock signal in the first device from the time the second time slot is received.

* * * * *